United States Patent
Vuorinen

(10) Patent No.: US 6,205,902 B1
(45) Date of Patent: Mar. 27, 2001

(54) METHOD AND ARRANGEMENT FOR ATTACHING TOOTH BITS TO SAW BLADE BODY

(75) Inventor: Markku Vuorinen, Tampere (FI)

(73) Assignee: Hackman TTT Oy Ab, Toijala (FI)

( * ) Notice: Subject to any disclaimer, the term of this patent is extended or adjusted under 35 U.S.C. 154(b) by 0 days.

(21) Appl. No.: 09/200,306

(22) Filed: Nov. 25, 1998

(51) Int. Cl.[7] .............................. B27B 33/08; B27B 33/12
(52) U.S. Cl. ................................... 83/839; 76/112
(58) Field of Search ........................ 76/112; 83/835–855; 407/61

(56) References Cited

U.S. PATENT DOCUMENTS 4,587,876 * 5/1986 Erhardt ............................ 83/855 X

* cited by examiner

Primary Examiner—Douglas D. Watts
(74) Attorney, Agent, or Firm—Alston & Bird LLP

(57) ABSTRACT

The invention relates to a method for attaching tooth bits to a saw blade body. The mating surface (8) of an attachment point provided in the blade body, transverse to the blade's direction of motion (A), is formed such that it is rearwardly oblique at its outermost part, whereby the blade body (4) may bypass a broken tooth bit fragment (5) without being damaged. A discontinuity point, at which the tooth bit (2) fractures controllably, may also be formed in the tooth bit (2).

Figure 1A:
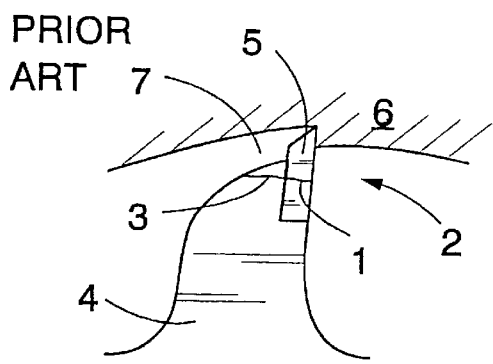

The invention further relates to an arrangement for attaching the tooth bits (2) to the blade body (4) used in sawing. In the arrangement, the outermost part of the mating surface (8) supporting the tooth bit (2) is formed to be rearwardly oblique and the tooth bit (2) has a given protrusion (10) with respect to the blade body (4), with the result that the blade body (4) may bypass the tooth bit fragment (5) without breakage.

6 Claims, 1 Drawing Sheet

METHOD AND ARRANGEMENT FOR ATTACHING TOOTH BITS TO SAW BLADE BODY

The invention relates to a method for attaching tooth bits to a body of a blade used in sawing, in which method replaceable tooth bits are attached to be immovable with respect to the blade body to an attachment point provided for each tooth bit, on the cutting edge side of the blade body, whereby mating surfaces of each attachment point receive forces exerted on the tooth bit and wherein the tooth bits are attached in such a way that their outermost point is at a distance from the outermost point of the blade body, with the result that the tooth bits protrude with respect to the attachment point and a space remains between the blade body and a workpiece.

The invention further relates to an arrangement for attaching the tooth bits to the body of the blade used in sawing, which arrangement comprises attachment points provided in the blade body for replaceable tooth bits, to which points the tooth bits are arranged to be attached, whereby the mating surfaces of the attachment points are arranged to receive forces exerted on the tooth bits and wherein the tooth bits are attached in such a way that their outermost point is at a distance from the outermost point of the attachment point, with the result that the tooth bits protrude with respect to the blade body, and a space remains between the blade body and a workpiece.

Sawmills, various sawing machines and the like employ circular saws, in which separate tooth bits effecting the actual cutting, generally made of harder and more wear-resistant material than the blade body, are arranged on the outer circumference of the blade body of said circular saw. The tooth bits are in general made of hard metal, ceramic material or some other appropriate material. The blade body is in general tool-making steel or the like. In general, the tooth bits are attached to the body by brazing, by means of an interlocking structure, with screws, rivets, or for instance, by means of appropriate quick clamping means. Several alternative attachment methods are known, so they are not described in greater detail herein. Apart from circular saws, it is possible to employ separate tooth bits attached to the basic blade also in band saw blades and similar straight-edged blades.

However, a drawback with the prior art solutions is that when the tooth bit breaks, for instance, by the effect of a harder spot, such as a nail, stone or frozen knot, in the material to be sawn, a fragment breaking off the tooth bit causes damage also to the blade body when falling between the blade body and the workpiece. The problem is that the tooth bit in general breaks at an unpredictable or unsuitable point, and consequently the broken fragment is often of considerable size and such in shape that it causes damage to the blade body. A detached tooth bit fragment may cause damage to the blade body at the mating surface of the tooth bit or otherwise deteriorate the blade body and the attachment of a new tooth bit, which may have a consequence that no new tooth bits can be attached reliably to the blade body. So the blade body has to be discarded. In case of minor damages, it may be possible to repair the blade body by welding and grinding, but nevertheless this involves significant costs and extra work. Moreover, the properties of the repaired blade body are not necessarily equal to those of the original body any longer, in particular if the same point is subjected to repairs several times. Particularly, the interlocked tooth bits are critical with regard to the blade body damage, and they hardly allow deviations in the blade body geometry.

The object of this invention is to provide a method and an arrangement for attaching a tooth bit to a blade body, which prevents the blade body from being damaged in connection with tooth bit breakage.

The method of the invention is characterized in that the mating surface of an attachment point provided in the blade body for the tooth bit, transverse to the blade's direction of motion, is formed such that it is rearwardly oblique at its outermost part, and as a result, due to the oblique mating surface and the space, the blade body can bypass the detached tooth bit fragment without that the mating surface is damaged.

The arrangement of the invention is further characterized in that the mating surface of the attachment point provided in the blade body for the tooth bit, transverse to the blade's direction of motion, is formed such that it is rearwardly oblique at its outermost part, and as a result it is possible for the blade body to bypass the tooth bit fragment without that the mating surface is damaged.

The basic idea of the invention is that the outermost section of the mating surface, which is formed in the blade body and which supports the tooth bit in the direction of sawing, is formed oblique to the effect that the outermost parts of the blade body can bypass breaking tooth bit fragments more smoothly and easily without them causing damage to the blade body. Moreover, it is required that the tooth bit protrudes to some extent with respect to the outermost part of the attachment point allowing the tooth bit fragment to make way for the blade body safely. Further, the basic idea of one preferred embodiment of the invention is that the breakage point of the tooth bit is predetermined by providing a discontinuity to the effect that a breaking tooth bit fragment is advantageous in shape and size.

The invention has an advantage that if sawing hits a spot which is exceptionally hard and which causes damage to the blade, the expensive blade body remains intact and only a wearing part, i.e. the tooth bit, breaks. It is not a problem to replace a broken tooth bit, if the blade body remains undamaged. The price of tooth bits is low as compared with the price of the blade body, and the tooth bits have to be changed in any case every now and then, since they become dull. With the solution of the invention sawing costs can be reduced considerably, because the blade costs decrease since the blade body repair and discard can be avoided. A further advantage is that the solution of the invention can be applied to most previously known blade attachment mechanisms, its structure is simple and, moreover, it is readily manufactured. An advantage with one preferred embodiment of the invention is that when a breakage point of the tooth bit is predetermined by forming a discontinuity therein, the tooth bit breaks controllably at a predetermined point and in a predetermined manner.

Figure 1B:
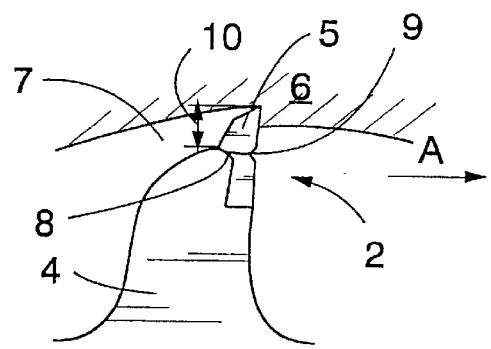
Figure 1C:
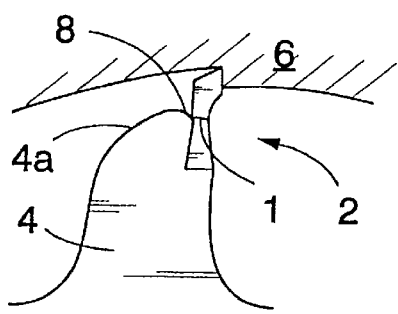
Figure 1D:
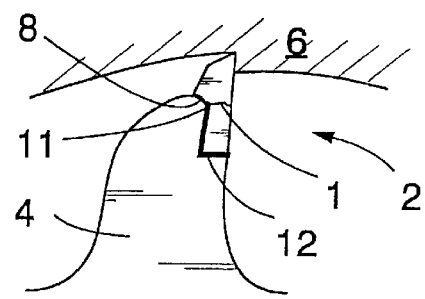
Figure 2A:
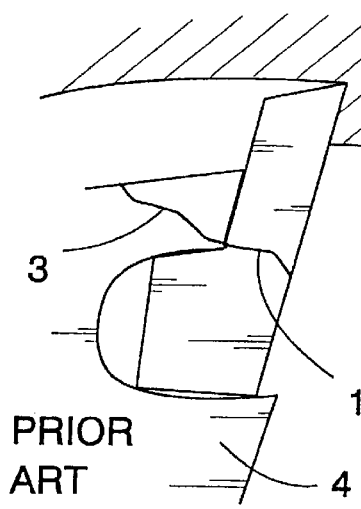
Figure 2B:
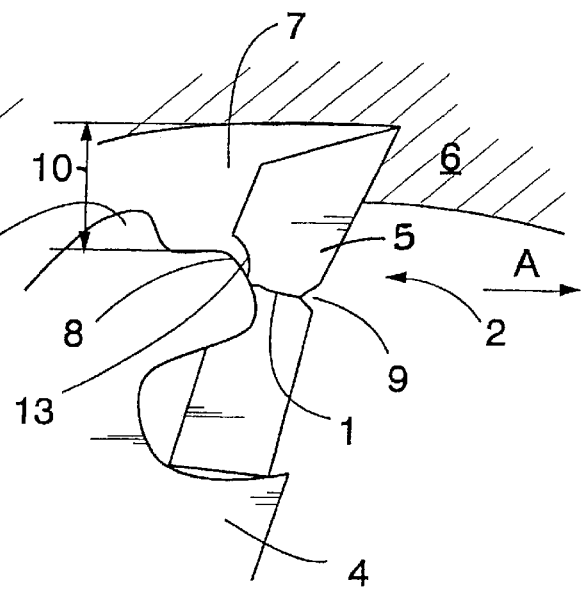

The invention will be described in greater detail in the attached drawing, wherein FIG. 1a shows a simplified schematic view and a partial cross-section of one prior art solution for attaching a tooth bit, and FIGS. 1b to 1d illustrate blades of similar type, to which the solution of the invention is applied for attaching the tooth bit to the blade body, and FIG. 2a shows a simplified schematic view and a partial cross-section of another tooth bit attachment method of the prior art and FIG. 2b illustrates a blade of a similar type, to which the solution of the invention is applied.

In FIG. 1a illustrating the prior art, the reference numeral 1 indicates a probable breakage point of a tooth bit 2. Further in the figure, the reference numeral 3 indicates a point where a blade body 4 generally fractures after a fragment 5 broken off the tooth bit 2 has wedged with great force between the outermost part of a tooth in the blade body 4 and a workpiece 6. The tooth bit fragment 5 has no chance to move aside smoothly into a space between the blade body 4 and the workpiece 6, but the fragment wedges abruptly and causes breakage of the outermost part of the blade body 4. It is to be noted here that, in the drawings of the application, like reference numerals refer to like parts and for the sake of clarity the tooth bits and the attachment point have been partly enlarged.

FIG. 1*b* shows an improved solution in accordance with the invention over the blade of FIG. 1*a*. Also in this case the tooth bit 2 is brazed to the blade body 4, in which an attachment point with a mating surface is provided for the tooth bit. In this case, the mating surface 8, which is transverse to the blade's direction of motion A, is formed to curve rearward at its outermost part, i.e. the outermost tip of a tooth in the blade body 4 is rounded in a way. Thus the blade body may controllably bypass a tooth bit fragment 5. It is also possible to render the outermost part of the mating surface oblique in other manners. The surface does not necessarily have to be curved, but it may also be an oblique surface rising rearward at an appropriate angle in the opposite direction to the blade's direction of motion A. Whether the surface is straight or rounded, the substantial point is that the oblique surface ensures that the tooth bit fragment 5 moves aside away from the outermost parts of the mating surface 8 without that it wedges in with serious consequences. The exact geometry of the mating surface 8 is selected on the basis of the blade type, tooth bit material, workpiece material, tooth bit attachment mechanism, tooth bit geometry and desired tooth bit breakage point. This can be determined on the basis of test results, for instance. To ensure that the attachment is as stable as possible, the tooth bit 2 is preferably formed such that it also bears against the curved section of the mating surface 8 in a manner described in FIG. 1*b*. However, it is not necessarily attached to the blade body at this point, but it suffices that the curved section receives some of the forces, opposite to the blade's cutting direction A, exerted on the tooth bit. As appears from the figure, a weakening 9 is also provided in the tooth bit for a particular purpose. The weakening 9 may be for instance a notch or a groove whose purpose is to provide a directed, predictable breakage at a desired breakage point, when subjected to a force which exceeds the predetermined force. The weakening 9, such as a groove, can be provided on the leading edge of the tooth bit, i.e. on the side of the cutting edge, on its back, sides, or if necessary, all the way around. The position of the weakening 9 in the tooth bit is determined considering the geometry and attachment of the tooth bit as well as its protrusion 10 to the effect that the breaking tooth bit fragment 5 has a chance to move aside away from the blade body 4 in the space 7. It is also possible to provide weakenings, such as notches, on the opposite sides of the tooth bit, at different levels, whereby a directed, oblique surface of fracture is obtained. Thus it is advantageous to provide the weakening point of the leading edge higher up than the one on the back, with the result that the fracture will be oblique in such a way that the tooth bit fragment will not cause problems. Weakening as described above may also serve satisfactorily without the oblique mating surface of the blade body.

It appears from FIG. 1*c* that a notch need not necessarily be formed in the tooth bit to provide a directed breakage, but it can be provided also by shaping the tooth bit to be thinner at a given point, as a result of which a weaker point, i.e. a kind of geometric discontinuity, is provided. One more option is to support the tooth bit on the blade body in such a manner that it allows a discontinuity to be formed at a desired breakage point. This kind of discontinuity may appear, for instance, at the junction 11 of the support or the attachment. An example of this is shown in FIG. 1*d*. For clarity, a brazed joint 12 attaching the tooth bit is indicated by a bold line in the figure. Naturally, the breakage point 1 is selected to the effect that the fragment 5 breaking off the tooth bit is such in shape and size that it slips into the space 7 as smoothly as possible and the outermost parts of the blade body 4 can pass it by. Naturally, it is possible to provide a discontinuity in the tooth bit by combining all the above-mentioned methods.

In blades of FIGS. 1*b* to 1*d*, the tooth bit fragment 5 turns after breaking, pushed by the blade, in the direction of the space 7 so that the surface of fracture points in the blade's cutting direction A. Hence it is preferable that the largest cross-sectional surface of the tooth bit 2 is smaller than the space 7. If the outermost point of the mating surface 8 is curved or oblique, the tooth bit fragment 5 is diverted little by little and controllably. In general, a clearance is provided on the rear edge 4*a* of a tooth in the blade body 4, whereby the space 7 grows larger after the outermost nose of the mating surface 8. The narrowest point is exactly at the outermost nose. When the nose has bypassed the tooth bit fragment 5, the danger of damage to the mating surface 8 no longer exists. Further, it contributes to the diversion of the tooth bit fragment in the space if the fragment can penetrate into a workpiece of softer material to some extent or at least for some parts. If necessary, the oblique outermost part of the blade body's mating surface contributes to the controllable penetration of the tooth bit fragment into the workpiece.

FIGS. 2*a* and 2*b* show an interlocking tooth bit arrangement. The FIG. 2*a* shows a prior art solution and FIG. 2*b* an improved version in accordance with the invention. In FIG. 2*a*, the reference numeral 1 indicates a breakage point at which the tooth bit 2 most likely breaks, if the geometry of the tooth bit 2 and the blade body 4 is similar to that in the figure. Consequently, the blade body 4 breaks at a point 3, whereafter no new tooth bit can be attached thereto. On the other hand, FIG. 2*b* shows a solution in accordance with the invention, in which the outermost part of the mating surface 8 is formed to curve rearward. In addition, the tooth bit 2 must have a given protrusion 10, in order that the tooth bit fragment 5, which is broken off the breakage point 1, would not damage the blade body 4. A notch or some other corresponding weakening 9 is also formed in the tooth bit, in the manner illustrated in the figure, for forming a discontinuity point at the desired breakage point 1. The figure further shows that the rear edge of the tooth bit 2 can also be formed oblique or curved at a point 13 which corresponds to the outermost part of the mating surface 8. Also this facilitates the movements between the tooth bit fragment 5 and the outermost parts of the blade body 4 in case of a blade breakage.

Furthermore, it is possible to arrange a protective tooth 14 in the blade body 4, the purpose of the tooth, in a normal situation, being to prevent the blade from biting into the workpiece 6 in excess of predetermined feed and thereby, for its part, to prevent blade damage. This kind of protective tooth 14 can be separate from an actual cutting tooth or it is also possible to form the tooth in connection with the cutting tooth in the manner shown in FIG. 2*b*. The substantial point is that the outermost point of the protective tooth extends outside the outermost part of the transverse mating surface 8, but naturally lower than the outermost point of the intact tooth bit, in order to enable cutting in the first place. When the protective tooth 14 is formed in connection with the cutting tooth, it comprises a rounded projecting part after the outermost section of the mating surface 8. Naturally, the protective tooth 14 is formed in such a way that it does not hinder the blade body 4 in any way from bypassing the tooth bit fragment 5 at the mating surface 8. The protective tooth 14 can be a replaceable wearing piece. In addition to excessive feed, the protective tooth 14 prevents the mating surface 8 from coming into contact with the workpiece 6 after the blade has hit a nail, for instance, at high speed and its tooth bits have broken. Thus, by means of the protective tooth 14, damage to the outermost part of the transverse mating surface 8, which is critical to reliable attachment of the tooth bit 2, can be prevented.

The drawings and the description related thereto are only intended to illustrate the inventive idea. The details of the invention may vary within the scope of the accompanying claims. So the tooth bit need not necessarily be of the type shown in the figure, and it need not necessarily bear against a curved mating surface, if it is possible to attach the tooth bit in some other stable manner. Furthermore, it is possible in some cases to modify the blade bodies in use in accordance with the invention. The solution of the invention is most advantageously applicable to sawing in which the workpiece is of a clearly softer material than the material of the blade body. Thus the blade body may push the tooth bit fragment to some extent into the workpiece without damage being caused to the blade body in any way. As the blade body is generally made of rather high-strength tool-making steel or the like, this kind of blade can be used for sawing, for instance, aluminum and other light metals, as well as plastic materials, not to mention plates and other products made of pulp, gypsum and other mixes and filling materials. Furthermore, when the oblique outermost part of the mating surface controllably presses e.g. a ceramic tooth bit, it crushes under the pressure into smaller and less harmful fragments. The ceramic or some other correspondingly hard tooth bit is rather brittle and it crushes by the effect of a suitable force. On the other hand, when wedging suddenly in, even a brittle piece may cause damage to the blade body.

What is claimed is:

1. A saw blade arrangement comprising:

a blade body having outwardly projecting tooth portions defining forward, top and rear areas, a replaceable tooth bit having forward and rear areas mounted and supported on each of said blade body tooth portions at attachment points on at least the forward area of said blade body tooth portions and the rear area of said tooth bits, said tooth bits protruding upwardly a predetermined distance above the top area of said blade body tooth portions and;

said blade body tooth portions and said tooth bits having respective mating surfaces which include said attachment points, said mating surface of said blade body tooth portions including a generally oblique rearwardly-extending outermost section.

2. A saw blade arrangement, as set forth in claim 1, further including means in each of said replaceable tooth bits for weakening said tooth bit at a desired location to provide a predictable breakage of said tooth bit at said desired location.

3. A saw blade arrangement, as set forth in claim 2, in which said weakening means is in the form of a geometrical discontinuity.

4. A saw blade arrangement, as set forth in claim 3, in which said geometrical discontinuity forming said weakening means is in the form of a notch at the desired location.

5. A saw blade arrangement, as set forth in claim 3, in which said geometrical discontinuity forming said weakening means is in the form of a thinner area in said replaceable tooth bit at the desired location.

6. A saw blade arrangement, as set forth in claim 1, in which said blade body further includes a protective tooth portion positioned behind said outwardly projecting tooth portion which supports and mounts said replaceable tooth bit.

* * * * *

UNITED STATES PATENT AND TRADEMARK OFFICE
CERTIFICATE OF CORRECTION

PATENT NO. : 6,205,902 B1  
DATED : March 27, 2001  
INVENTOR(S) : Vuorinen

Page 1 of 1

It is certified that error appears in the above-identified patent and that said Letters Patent is hereby corrected as shown below:

<u>Title page,</u>  
Insert the following:  
-- [30] Foreign Application Priority Data  
   Nov. 25, 1997     (FI)    974325 --.

Signed and Sealed this

Eighteenth Day of September, 2001

Attest:

*Attesting Officer*

NICHOLAS P. GODICI  
*Acting Director of the United States Patent and Trademark Office*